United States Patent
Cocora et al.

(10) Patent No.: US 10,035,177 B2
(45) Date of Patent: Jul. 31, 2018

(54) METHOD AND DEVICE FOR CLEANING DEPOSITED MATERIAL FROM A MOLDING SURFACE OF A MOLD FOR FORMING OPHTHALMIC LENSES

(71) Applicant: Novartis AG, Basel (CH)

(72) Inventors: Gabriela Cocora, Elsenfeld-Eichelsbach (DE); Halina Heidrich, Kahl am Main (DE); Fabian Kern, Amorbach (DE); Axel Heinrich, Aschaffenburg (DE); Volker Lanig, Giebelstadt (DE)

(73) Assignee: Novartis AG, Basel (CH)

( * ) Notice: Subject to any disclaimer, the term of this patent is extended or adjusted under 35 U.S.C. 154(b) by 351 days.

(21) Appl. No.: 14/960,604

(22) Filed: Dec. 7, 2015

(65) Prior Publication Data

US 2016/0158808 A1 Jun. 9, 2016

Related U.S. Application Data

(60) Provisional application No. 62/088,833, filed on Dec. 8, 2014.

(51) Int. Cl.
*B08B 7/00* (2006.01)
*B08B 1/00* (2006.01)
(Continued)

(52) U.S. Cl.
CPC ............ *B08B 1/006* (2013.01); *B08B 1/04* (2013.01); *B08B 9/00* (2013.01);
(Continued)

(58) Field of Classification Search
CPC .. B08B 1/006; B08B 1/04; B08B 9/00; B29D 11/00125; B29D 11/00432; B29D 11/00519
See application file for complete search history.

(56) References Cited

U.S. PATENT DOCUMENTS 6,638,362 B2 * 10/2003 Dobner ............... B29C 37/02
134/6
8,721,934 B2 * 5/2014 Heinrich ............ B29C 71/0009
264/2.7
(Continued)

FOREIGN PATENT DOCUMENTS

EP 1566250 A1 8/2005
WO 2005033504 A1 4/2005

OTHER PUBLICATIONS

PCT Written Opinion of the International Searching Authority dated Mar. 3, 2016, International Application No. PCT/EP2015/078785 International Filing Date Dec. 7, 2015.
(Continued)

*Primary Examiner* — Sharidan Carrillo
(74) *Attorney, Agent, or Firm* — Robert A. Ambrose

(57) ABSTRACT

A method of cleaning deposited material from a molding surface (10) of a mold (1) for forming ophthalmic lenses, including bringing a cleaning head (20) into contact with the molding surface (10), the rotational axis (22) of the cleaning head (20) being arranged normal to the molding surface (10), rotating (220) the cleaning head (20) around the rotational axis (22) while maintaining the contact between the cleaning head (20) and the molding surface (10), moving the cleaning head (20) to perform a precession motion (110) around a central normal (11) on the molding surface (10), while rotating (220) the cleaning head (20) around the rotational axis (22) and while maintaining the contact between the cleaning head (20) and the molding surface (10). During the precession motion (110) the rotational axis (22) includes an inclination angle ($\alpha_1, \alpha_2$) with the central normal (11) on the molding surface (10).

14 Claims, 1 Drawing Sheet

(51) Int. Cl.
  B29D 11/00  (2006.01)
  B08B 1/04   (2006.01)
  B08B 9/00   (2006.01)
(52) U.S. Cl.
  CPC .. B29D 11/00125 (2013.01); B29D 11/00432 (2013.01); B29D 11/00519 (2013.01)

(56) References Cited

U.S. PATENT DOCUMENTS

| | | | |
|---|---|---|---|
| 2005/0167862 A1 | 8/2005 | Sano | |
| 2005/0286016 A1* | 12/2005 | Hosoda | B08B 1/007 351/159.01 |
| 2014/0123413 A1 | 5/2014 | De Palma | |
| 2016/0158808 A1* | 6/2016 | Cocora | B29D 11/00432 134/6 |
| 2017/0064974 A1* | 3/2017 | Rotter | A23B 7/015 |

OTHER PUBLICATIONS

PCT International Search Report dated Mar. 3, 2016 International Application No. PCT/EP2015/078785 International Filing Date Dec. 7, 2015.

* cited by examiner

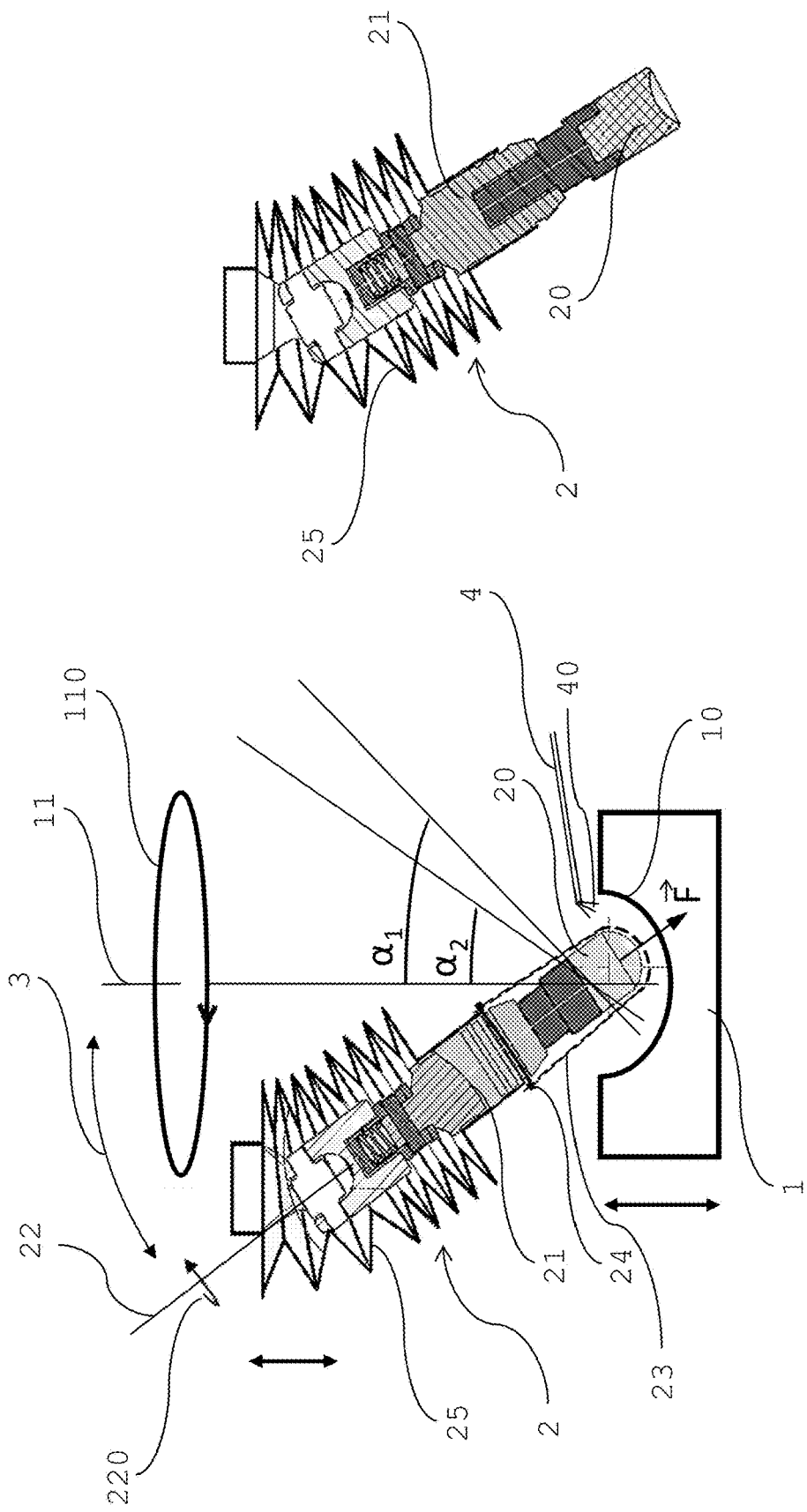

METHOD AND DEVICE FOR CLEANING DEPOSITED MATERIAL FROM A MOLDING SURFACE OF A MOLD FOR FORMING OPHTHALMIC LENSES

This application claims the benefit under 35 U.S.C. § 119 (e) of U.S. provisional application Ser. No. 62/088,833 filed on Dec. 8, 2014, herein incorporated by reference in its entirety.

FIELD

The invention relates to a method of cleaning deposited material from a molding surface of a mold for forming ophthalmic lenses, in particular contact lenses. The invention also relates to a device for carrying out the method.

BACKGROUND

It is known to produce ophthalmic lenses, in particular contact lenses such as soft contact lenses, in an automated manufacturing process using reusable molds. In mass production of contact lenses, specifically disposable lenses which are worn only once and are then disposed of, a high number of contact lenses must be manufactured in a relatively short period of time. In an embodiment of such process for the mass production of soft contact lenses, a lens forming material, for example a polymer or prepolymer solution, is introduced into a female mold half, the mold is closed by the respective male mold half, and then the lens forming material is polymerized and/or cross-linked with the aid of ultraviolet (UV) light to form the contact lens. The mold is subsequently opened and the lens is removed from the male or female mold half of the opened mold. Suitable polymers formed by photochemical polymerization of suitable prepolymers include polymers based on polyvinyl alcohols (PVA) or silicone hydrogels (SiHy).

After removal of the lens from the male or female mold half, the male and female mold halves are cleaned so as to remove any lens forming material or other residues that may have deposited on the molding surface. During cleaning of the mold the molding surface is exposed to a jet of a cleaning liquid, which may comprise deionized water and/or organic solvents, and is subsequently dried. However, despite this cleaning process the deposits may not absolutely completely be removed from the molding surface. And although such minimal amounts of deposits may accumulate on the molding surface over a considerable number of production cycles they are so small that the contact lenses produced are well within the specifications as regards their optical and geometrical properties, so that these lenses are not detected as being defective during optical inspection. The residues on the molding surface may be so small that over a considerable number of production cycles they may not even be visible on the molding surfaces. However, as the number of production cycles continues to grow the deposits on the molding surface may accumulate more and more until they may reach a level where the contact lenses are detected as not being within the specifications during the inspection process. From that time, continuing production of contact lenses using this mold would lead to contact lenses which are rejected due to the lenses being outside the specifications.

Therefore, in order to obtain fault-free contact lenses which are well within the specifications the deposits must be reliably removed from the molding surface on a regular basis, and in particular the deposits have to be removed before they have accumulated to an amount where the contact lenses produced from the mold having the accumulated deposits on its molding surface are detected as being defective. And while methods for abrasively cleaning these deposits from the reusable molds are available, such abrasive cleaning may result in the molding surface of the mold getting damaged, and this molding surface is a surface that must have optical quality and must be able to stand a high number of production cycles. Since the reusable molds are very expensive, abrasion of the molding surface must be prevented while at the same time the molding surface must be reliably cleaned.

SUMMARY

It is therefore an object of the present invention to provide a method and a device for reliably removing the deposits from the molding surface of an ophthalmic lens mold, in particular from the molding surface of a contact lens mold, without damaging the molding surface.

In order to overcome these problems, the present invention suggests a method and a device as it is specified by the features of the independent claim directed to the method and the device, respectively. Embodiments of the method and device according to the invention are the subject matter of the dependent claims.

As regards the method, a method of cleaning molding surfaces of a mold for forming ophthalmic lenses, in particular contact lenses from deposited lens forming material is suggested.

In particular, the invention provides a method of cleaning deposited material from a molding surface of a mold for forming ophthalmic lenses, in particular contact lenses. The method involves bringing a cleaning head having a rotational axis into contact with the molding surface, the rotational axis of the cleaning head being arranged normal to the molding surface, and rotating the cleaning head around the rotational axis while maintaining the contact between the cleaning head and the molding surface. The cleaning head is moved to perform a precession motion around a central normal on the molding surface running through the apex thereof, while rotating the cleaning head around the rotational axis and while maintaining the contact between the cleaning head and the molding surface. During this precession motion, the rotational axis of the cleaning head includes an inclination angle with the central normal on the molding surface.

According to one aspect of the method according to the invention, the inclination angle is in the range of up to 40°, particularly in the range of up to 35° for a female and up to 25° for a male mold.

According to a further aspect of the method according to the invention, while being in contact with the molding surface the cleaning head is pressed against the molding surface using a force in the range of 10-20 N, preferably a force of about 16 N.

According to still a further aspect of the method according to the invention, the cleaning head is made of silicone.

According to yet a further aspect of the method according to the invention, the cleaning head is made of a foamed material.

Still in accordance with a further aspect of the method according to the invention, the cleaning head is covered with a cloth.

In accordance with another aspect of the method according to the invention, the cleaning head has a concave or convex shape matching the concave or convex shape of the molding surface.

Yet in accordance with another aspect of the method according to the invention, the method further comprises the step of dispensing a cleaning liquid onto the molding surface. In accordance with this aspect, for example an amount of up to 300 μl of the cleaning liquid, preferably an amount of 50 μl to 200 μl for a female mold and 150 μl to 300 μl for a male mold, is dispensed onto the molding surface.

In accordance with a further aspect of the method according to the invention, the cleaning head is moved to perform the precession motion with a rotational speed of 10 revolutions per minute to 300 revolutions per minute around the central normal on the molding surface, preferably with a rotational speed of 10 revolutions per minute to 100 revolutions per minute, most preferably with a rotational speed of about 100 revolutions per minute, and wherein the cleaning head is rotated around its rotational axis with a rotational speed of 10 revolutions per minute to 300 revolutions per minute, preferably with a rotational speed of 50 revolutions per minute to 300 revolutions per minute, most preferably with a rotational speed of about 110 revolutions per minute.

In accordance with a still further aspect of the method according to the invention, the molding surface is a convex molding surface, and the cleaning of the convex molding surface is started at an inclination angle, preferably at an inclination angle of 25°. The inclination angle is then decreased stepwise until the rotational axis of the cleaning head and the central normal on the molding surface coincide.

In accordance with another aspect of the method according to the invention, the molding surface is a concave molding surface, and the cleaning of the concave molding surface is started with the rotational axis of the cleaning head and the central normal on the molding surface coinciding. The inclination angle is then increased stepwise, preferably up to an inclination angle of 35°.

As regards the device for cleaning deposited material from a molding surface of a mold for forming ophthalmic lenses, in particular contact lenses, the device according to the invention comprises at least one cleaning head for cleaning deposited material from the molding surface. The cleaning head has a rotational axis. Additionally, the device comprises a positioning device for bringing the molding surface and the cleaning head in a predefined position relative to one another, in which a central normal on the molding surface running through the apex thereof and the rotational axis of the cleaning head coincide. Furthermore, the device includes a tilting device for tilting the cleaning head such that the rotational axis of the cleaning head and the central normal on the molding surface include an inclination angle. The device further includes a first drive for rotating the cleaning head around the rotational axis, a second drive for moving the cleaning head to perform a precession motion around the central normal on the molding surface, and a controller for controlling the position of the molding surface and of the cleaning head relative to one another, for controlling the rotational speed of the cleaning head around the rotational axis, for controlling the rotational speed of the precession motion of the cleaning head around the central normal on the molding surface, and for controlling the inclination angle between the rotational axis and the central normal on the molding surface.

According to one aspect of the device according to the invention, the device further comprises a dispensing needle for dispensing a cleaning liquid onto the molding surface.

According to a further aspect of the device according to the invention, the cleaning head is mounted to a rotational support, and a cloth is attached to the rotational support so as to cover the cleaning head.

The afore-mentioned aspects of the method according to the invention have a number of advantages. One advantage is the reliable manufacture of ophthalmic lenses, in particular contact lenses, without any lenses being produced which are outside the specifications due to too much deposits having accumulated on the lens molding surface of the molds. Such deposits are removed before they have accumulated to an extent that they would lead to defective lenses being produced. The method may be either performed in-line in a fully automated or semi-automated process for forming ophthalmic lenses, or may be performed off-line separate from such fully automated or semi-automated process for forming ophthalmic lenses. In the latter case, the reusable molds comprising the molding surfaces to be cleaned have to be removed from the automated production line for being cleaned after a predetermined number of production cycles (numbers of contact lenses produced using the respective reusable mold). For example, after 600 production cycles the reusable molds may be removed from the production line and may be cleaned in accordance with the invention.

Cleaning of the molding surfaces may start with the rotational axis of the cleaning head coinciding with the central normal on the molding surface, or may start with these axes including an inclination angle. The inclination angle between the rotational axis of the cleaning head and the central normal on the molding surface running through the apex thereof may be increased or decreased stepwise, for example in steps of 1° to 10°, preferably in steps of 5°. This ensures a complete and reliable cleaning of the entire molding surface. The cleaning time at each inclination angle may for example be in the range of 10 seconds to 300 seconds, more particularly in the range of 10 seconds to 30 seconds.

While being in contact with the molding surface, and in particular during the rotational movement and the precession movement of the cleaning head, the cleaning head is preferably pressed against the molding surface with the predetermined force in the range specified above which is sufficient on one hand to reliably remove the deposited material from the lens forming surface while at the same time a force in the said range prevents the molding surface of the mold from getting damaged.

The cleaning head is preferably made of silicone or a foamed material (for example polyurethane) which are particularly well suitable for the gentle removal of the deposited material from the molding surface without abrasion of the molding surface of the mold.

The cleaning head may be covered by a cloth, for example a microfiber cloth, which may lead to excellent results in the cleaning of the molding surface. The cloth also may provide for additional protection of the molding surface, while deposits removed from the molding surface may be held back (entrapped) within the cloth structure.

The cleaning head may have a concave or convex shape matching the concave or convex shape allowing for optimal cleaning conditions with minimal impact on the molding surface by evenly distributing the pressure applied to the surface of the cleaning head in contact with the molding surface, and also allows for an optimal use of the cleaning head surface.

A cleaning liquid may optionally be added onto the molding surface, in particular in case of persistent residues or to loosen the residues before the mechanical cleaning process begins. The amount of cleaning liquid specified above may lead to an increased performance in the cleaning of the molding surface. The cleaning liquid may be, for example, deionized water, alcohols, surfactants or mixtures thereof.

When the molding surface is a convex molding surface, cleaning of the convex molding surface is advantageously started at an inclination angle of 25° between the rotational axis and the central normal onto the molding surface, and the inclination angle is then stepwise decreased, preferably in 5° steps, until the rotational axis of the cleaning head and the central normal on the molding surface coincide. Accordingly, the precession movement starts at an inclination angle of 25°, and after a predetermined cleaning time (rotational movement and precession movement of the cleaning head at 25°) the rotational axis is then moved to an inclination angle of 20° at which cleaning is again performed for a predetermined cleaning time. Thereafter, the rotational axis is moved to an inclination angle of 15° at which cleaning is performed for a predetermined cleaning time, and so on. Thus, the rotational axis is moved in steps of 5° towards the central normal on the convex molding surface.

When the molding surface is a concave molding surface, however, cleaning of the concave molding surface is advantageously started with the rotational axis of the cleaning head and the central normal on the molding surface coinciding, and the inclination angle then increased stepwise, preferably in 5° steps, until the rotational axis of the cleaning head and the central normal onto the molding surface include an inclination angle of 35°. This is performed in a similar manner as is described in the preceding paragraph, however, in this case the rotational axis is moved in steps of 5° away from the central normal on the concave molding surface.

BRIEF DESCRIPTION OF THE DRAWINGS

Further advantageous aspects of the invention become apparent from the following description of embodiments of the invention with the aid of the drawings in which:

FIG. 1 is a schematic representation showing components of a device according to the invention for cleaning the molding surface of a concave contact lens mold, and FIG. 2 is a schematic representation of similar components of a device for cleaning a convex contact lens mold.

DETAILED DESCRIPTION OF EMBODIMENTS

FIG. 1 shows a female mold 1 having a molding surface 10 to be cleaned, as well as components of a device according to one embodiment of the invention. In particular, a cleaning member 2 comprising a cleaning head 20 having a convex shape and a rotational support 21 is shown, with cleaning head 20 being attached to rotational support 21. Cleaning head 20 (as well as cleaning member 2) has a rotational axis 22 and can be rotated about this rotational axis 22. In addition, a cloth 23 is attached to rotational support 21 by means of a clamping ring 24 in a manner such that cloth 23 covers cleaning head 20. Cloth 23 can be removed by removing clamping ring 24 in order to replace a used cloth or to replace the cloth actually attached to rotational support 21 with a cloth having different properties than the one actually attached to rotational support 21. Alternatively, molding surface 10 can be cleaned by cleaning head 2 without using a cloth 23 covering the cleaning head 2. As can be seen from FIG. 1, cleaning head 20 has a convex shape matching concave shape of concave molding surface 10.

Generally, cleaning head 20 can be made of any material suitable for cleaning molding surface 10 without abrasion of molding surface 10. An example for such material is silicone, however, other materials are suitable as well. For example, cleaning head 20 can be made of a foamed material such as foamed polyurethane.

In addition, a tilting device is provided as is indicated by double-headed arrow 3 with the aid of which rotational support 21 as well as cleaning head 20 can be tilted such that rotational axis 22 is inclined by an inclination angle relative to a central normal 11 running through the apex (here: the lowermost point) of concave molding surface 10. In FIG. 1, two such inclination angles $\alpha_1$, $\alpha_2$ are indicated by way of example.

In addition, and a dispensing needle 4 is provided for dispensing a cleaning liquid 40 into female mold 1. The cleaning liquid may be, for example, deionized water, alcohols, surfactants or mixtures thereof.

A positioning device (not shown) is provided bringing molding surface 10 of female mold 1 and cleaning head 2 into a predefined position relative to one another. In addition, a first drive is provided for rotating rotational support 21 together with cleaning head 20 about rotational axis 22, this being indicated by arrow 220 in FIG. 1. In addition, a second drive is provided for moving the rotational support 21 together with cleaning head 20 to perform a precession movement around the central normal 11 on the molding surface 10, this being indicated in FIG. 1 by arrow 110. Finally, a controller (now shown) is provided for controlling the position of the molding surface 10 and of the cleaning head 20 relative to one another, for controlling the rotational speed of the precession motion of the cleaning head 20 around the central normal 11 on the molding surface 10, and for controlling the inclination angle between the rotational axis 22 and the central normal 11 on the molding surface 10.

In the following, an embodiment is described how cleaning to the molding surface 10 of female mold 1 may be performed. First of all, rotational axis 22 of cleaning head 20 and the central normal 11 on concave molding surface 10 are brought into alignment such that they coincide, and the first drive rotates cleaning head 20 around the rotational axis with a rotational speed of, for example, 110 rpm (revolutions per minute), as indicated by arrow 220. Cleaning head 20 is then moved towards concave molding surface 10 and is brought into contact with molding surface 10 in a manner such that it is pressed against molding surface 10 with a predetermined force of, for example, about 16 N. In this relative position including no inclination angle between the central normal 11 on concave molding surface 10 and rotational axis 22, cleaning is performed for a period of, for example, 10 seconds.

Once this cleaning step is completed, the rotational axis 22 is tilted relative to the central normal 11 with the aid of the tilting device by an angle of 5°, so that the rotational axis 22 and the central normal 11 now include an inclination angle of 5°. Rotation of the cleaning head 20 around the (now inclined) rotational axis 21 is continued, however, in addition to the rotation of the cleaning head 20 around the (inclined) rotational axis 22, the cleaning head is moved with the aid of the second drive such that the cleaning head 20 performs a precession motion around the central normal 11, as this is indicated by arrow 110. This precession motion around the central normal is performed with a rotational speed of, for example, about 100 rpm (revolutions per minute) while at the same time the cleaning head is rotated around rotational axis 22 with a rotational speed of 110 rpm. The direction of the precession movement around the central normal 11 on the molding surface 10 and the direction of the rotation of the cleaning head 20 around the rotational axis 22 are opposite to each other. Again, cleaning head 20 may be pressed against molding surface 10 with a force F of about 16 N, and cleaning is performed at this relative position for a period of, for example, 10 seconds.

Once this cleaning step is completed, the rotational axis 22 is tilted relative to the central normal 11 with the aid of the tilting device by 5° again, so that the rotational axis 21 and the central normal 11 now include an inclination angle of 10°, and cleaning is performed in the manner already describe above. Thereafter, the inclination angle is increased again by another 5°, and so on, until a final inclination angle of 35° between the rotational axis 22 and the central normal 11 is reached, at which the last cleaning step is performed. Thereafter, cleaning head 20 can be retracted and female mold 1 with the cleaned molding surface can be removed and returned to the production process. As has been mentioned above already, this cleaning method is suitable to remove persistent residues from molding surface 10 without causing any abrasion of molding surface 10.

FIG. 2 shows another embodiment of the cleaning member 2 in which the cleaning head 20 has a concave shape in contrast to the embodiment of the cleaning head 20 shown in FIG. 1 which has a convex shape. However, the rest of the cleaning member may be identical to that already described above with the aid of FIG. 1, so that it is referred to the corresponding description above. It goes without saying that the embodiment of the cleaning member 2 comprising the cleaning head 20 having the concave shape is particularly suitable for the cleaning of the molding surface of a male mold (having a convex shape of the molding surface).

Also, the process of cleaning the convex molding surface is similar to the process already described above, so that it is referred to the corresponding parts of the description above. However, in the case of cleaning a male mold having a convex molding surface, the first cleaning step is performed at an inclination angle of 25° between the rotational axis of the cleaning head and the central normal on the moldings surface. Nevertheless, before being arranged to include the said inclination angle of 25°, first of all the rotational axis and the central normal on the molding surface are aligned to coincide, and only thereafter the tilting of the rotational axis to the inclination angle of 25° relative to the central normal is performed. Then, at the inclination angle of 25° the first cleaning step is performed. Once this cleaning step is completed, the inclination angle is decreased by 5°, the next cleaning step is performed, etc., until the rotational axis and the central normal on the moldings surface coincide. The last cleaning step is then performed with the rotational axis and the central normal on the molding surface coinciding, and then the mold with the cleaned molding surface is removed and returned to the production process.

As can be seen from FIG. 1 and FIG. 2, a flexible bellows-like protection sleeve 25 may be provided covering the moving parts of cleaning member 2 so as to prevent that any particles or lubricant may come into contact with the molding surface of the mold to be cleaned.

While the invention has been described with the aid of embodiments, it is evident for the person skilled in the art that various changes and alterations can be made without departing from the technical teaching underlying the invention. Therefore, the invention is not intended to be limited to the described embodiments, but rather the scope of protection is defined by the appended claims.

The invention claimed is:
1. A Method of cleaning deposited material from a molding surface (10) of a mold (1) for forming ophthalmic lenses, the method comprising the steps of:
cleaning deposited material from a molding surface by bringing a cleaning head (20) having a rotational axis (22) into contact with the molding surface (10), the rotational axis (22) of the cleaning head (20) being arranged normal to the molding surface (10),
rotating (220) the cleaning head (20) around the rotational axis (22) while maintaining the contact between the cleaning head (20) and the molding surface (10),
moving the cleaning head (20) to perform a precession motion (110) around a central normal (11) on the molding surface (10) running through an apex of the molding surface thereof, while rotating (220) the cleaning head (20) around the rotational axis (22) and while maintaining the contact between the cleaning head (20) and the molding surface (10),
wherein during the precession motion (110) the rotational axis (22) of the cleaning head (20) includes an inclination angle ($\alpha_1,\alpha_2$) with the central normal (11) on the molding surface (10).

2. The method according to claim 1, wherein the inclination angle ($\alpha_1,\alpha_2$) is in a range of up to about 40°.

3. The method according to claim 1, wherein while being in contact with the molding surface, (10) the cleaning head (20) is pressed against the molding surface (10) using a force (F) in a range of about 10 N to about 20 N.

4. The method according to claim 1, wherein the cleaning head (20) is made of silicone or of a foamed material.

5. The method according to claim 1, wherein the cleaning head (20) is covered with a cloth (23).

6. The method according to claim 1, wherein the cleaning head (20) has a concave or convex shape matching a convex or concave shape of the molding surface (10).

7. The method according to claim 1, further comprising the step of dispensing an amount of up to about 300 μl of a cleaning liquid (40) onto the molding surface (10).

8. The method according to claim 1, wherein the cleaning head (20) is moved to perform the precession motion (110) with a rotational speed of about 10 revolutions per minute to about 300 revolutions per minute around the central normal (11) on the molding surface (10), and wherein the cleaning head (20) is rotated around its rotational axis (22) with a rotational speed of about 10 revolutions per minute to about 300 revolutions per minute.

9. The method according to claim 1, wherein the molding surface (10) is a convex molding surface, and wherein cleaning of the convex molding surface is started at the inclination angle ($\alpha_1,\alpha_2$) of about 25°, and wherein the inclination angle ($\alpha_1,\alpha_2$) is then decreased stepwise until the rotational axis (22) of the cleaning head and the central normal (11) on the molding surface (10) coincide.

10. The method according to claim 1, wherein the molding surface (10) is a concave molding surface, and wherein cleaning of the concave molding surface is started with the rotational axis (22) of the cleaning head (20) and the central normal (11) on the molding surface (10) coinciding, and wherein the inclination angle ($\alpha 1, \alpha 2$) is then increased stepwise, up to an inclination angle ($\alpha 1, \alpha 2$) of about 35°.

11. The method according to claim 2, wherein the inclination angle ($\alpha_1,\alpha_2$) is in a range of up to about 35° for a male mold and up to about 25° for a female mold.

12. The method according to claim 7, wherein the amount of cleaning liquid (40) is about 50 μl to about 200 μl for a female mold and an amount of about 150 μl to about 300 μl for a male mold (10).

13. The method according to claim 8, wherein the cleaning head (20) is moved to perform the precession motion (110) with a rotational speed of about 10 revolutions per minute to about 100 revolutions per minute around the central normal (11) on the molding surface (10), and wherein the cleaning head (20) is rotated around its rotational axis (22) with a rotational speed of about 50 revolutions per minute to about 300 revolutions per minute.

14. The method according to claim 13, wherein the cleaning head (20) is moved to perform the precession motion (110) with a rotational speed of about 100 revolutions per minute around the central normal (11) on the molding surface (10), and wherein the cleaning head (20) is rotated around its rotational axis (22) with a rotational speed of about 110 revolutions per minute.

* * * * *